(12) United States Patent
Liu et al.

(10) Patent No.: US 9,197,373 B2
(45) Date of Patent: Nov. 24, 2015

(54) METHOD, APPARATUS, AND SYSTEM FOR RETRANSMITTING DATA PACKET IN QUICK PATH INTERCONNECT SYSTEM

(71) Applicant: Huawei Technologies Co., Ltd., Shenzhen (CN)

(72) Inventors: Jiangen Liu, Hangzhou (CN); Gang Liu, Hangzhou (CN); Weiguang Cai, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 221 days.

(21) Appl. No.: 14/107,109

(22) Filed: Dec. 16, 2013

(65) Prior Publication Data

US 2014/0108878 A1 Apr. 17, 2014

Related U.S. Application Data

(63) Continuation of application No. PCT/CN2012/087042, filed on Dec. 20, 2012.

(30) Foreign Application Priority Data

Dec. 28, 2011 (CN) .......................... 2011 1 0448673

(51) Int. Cl.
*G08C 25/02* (2006.01)
*H04L 1/08* (2006.01)
(Continued)

(52) U.S. Cl.
CPC .. *H04L 1/08* (2013.01); *H04L 1/16* (2013.01); *H04L 69/40* (2013.01)

(58) Field of Classification Search
CPC ... H04L 1/1809; H04L 1/1812; H04L 1/1887; H04L 1/1819; H04L 1/188

USPC .......................................................... 714/748
See application file for complete search history.

(56) References Cited

U.S. PATENT DOCUMENTS

| 5,754,754 A | 5/1998 | Dudley et al. |
| 7,016,304 B2 | 3/2006 | Chou et al. |

(Continued)

FOREIGN PATENT DOCUMENTS

| CN | 1561602 A | 1/2005 |
| CN | 101043306 A | 9/2007 |

(Continued)

OTHER PUBLICATIONS

Foreign Communication From A Counterpart Application, PCT Application No. PCT/CN2012/087042, Chinese Search Report dated Apr. 4, 2013, 7 pages.

(Continued)

*Primary Examiner* — Albert Decady
*Assistant Examiner* — Enam Ahmed
(74) *Attorney, Agent, or Firm* — Conley Rose, P.C.; Grant Rodolph

(57) ABSTRACT

The present invention discloses a method for retransmitting a data packet in a quick path interconnect system, and a node. When a first node serves as a sending end, only the first data packet detected to be faulty is retransmitted to a second node, thereby saving system resources that need to be occupied in the data packet retransmission. When the first node serves as a receiving end, it implements that the packet loss does not occur in the first node in a case that the second node only retransmits the second data packet detected to be faulty, thereby ensuring reliability of the data packet transmission based on the QPI bus.

15 Claims, 8 Drawing Sheets

```
Detect a second data packet received by a first physical layer of a first
node connected to a QPI bus, and acquire a detection result, wherein the
second data packet is from a second node connected to the QPI bus;       11
buffer a second data packet detected to be correct in the detection result;
and generate a first retry request for a second data packet detected to be
faulty in the detection result, and send the first retry request to the
second node through the first physical layer
                                │
                                ▼
A first link layer sends each second data packet buffered before the
second data packet detected to be faulty to a first protocol layer of the
first node; detects a received second data packet corresponding to the      12
first retry request sent by the second node ; if the received second data
packet corresponding to the first retry request is detected to be correct,
sends the second data packet corresponding to the first retry request to
the first protocol layer; and sends a second data packet buffered after the
second data packet detected to be faulty to the first protocol layer
                                │
                                ▼
When a second retry request is received, lookup a first data packet
corresponding to the second retry request, and send the first data packet   13
corresponding to the second retry request to the second node through the
first physical layer
```

(51) Int. Cl.
    *H04L 1/16* (2006.01)
    *H04L 29/14* (2006.01)

(56) References Cited

U.S. PATENT DOCUMENTS

| | | | |
|---|---|---|---|
| 7,072,973 B1 * | 7/2006 | Newson | G06F 13/387 709/232 |
| 2002/0172164 A1 | 11/2002 | Chou et al. | |
| 2003/0066016 A1 | 4/2003 | Wehage | |
| 2006/0203716 A1 * | 9/2006 | Gilligan | H04L 1/0061 370/216 |
| 2007/0130353 A1 | 6/2007 | Chou et al. | |
| 2007/0223526 A1 | 9/2007 | Jiang | |
| 2009/0327826 A1 | 12/2009 | Inoue | |

FOREIGN PATENT DOCUMENTS

| | | |
|---|---|---|
| CN | 101621471 A | 1/2010 |
| CN | 102204149 A | 9/2011 |
| KR | 20100030745 A | 3/2010 |

OTHER PUBLICATIONS

Foreign Communication From A Counterpart Application, PCT Application No. PCT/CN2012/087042, Chinese Written Opinion dated Apr. 4, 2013, 4 pages.

Foreign Communication From A Counterpart Application, Chinese Application No. 201280001769.4, Chinese Search Report dated Oct. 15, 2013, 7 pages.

* cited by examiner

METHOD, APPARATUS, AND SYSTEM FOR RETRANSMITTING DATA PACKET IN QUICK PATH INTERCONNECT SYSTEM

CROSS-REFERENCE TO RELATED APPLICATIONS

This application is a continuation of International Application No. PCT/CN2012/087042, filed on Dec. 20, 2012, which claims priority to Chinese Patent Application No. 201110448673.X, filed on Dec. 28, 2011, both of which are hereby incorporated by reference in their entireties.

FIELD

The present invention relates to computer technologies, and in particular, to a method, an apparatus, and a system for retransmitting a data packet in a quick path interconnect system.

BACKGROUND

A quick path interconnect (QPI) technology is widely applied to data exchange between central processing units (CPUs) of a multi-processor platform, is a serial high-speed point-to-point connection protocol based on data packet transmission, and performs data transmission by adopting a differential signal and a dedicated clock, so as to implement direct interconnection between the CPUs, thereby providing a relatively higher access bandwidth. An interface protocol based on a QPI bus includes a physical layer (also referred to as a lower layer), a link layer, and a protocol layer (also referred to as an upper layer). The physical layer is responsible for receiving a data packet sent by an external CPU and sending a data packet to the external CPU. The protocol layer is responsible for internal communication between a QPI port and a CPU where the port is located. The link layer is located between a protocol side and the physical layer, and is responsible for sending a data packet from the protocol layer to the external CPU through the physical layer, decoding the data packet received by the physical layer, and sending, through the protocol layer, the successfully decoded data packet to the CPU where the port is located.

To improve reliability of data transmission between different CPUs in a QPI system, a data packet retransmission mechanism is introduced into the link layer in the QPI technology. In the QPI system, if a local link layer has detected that a data packet sent by a remote node is faulty, a retry request is sent to the remote node through a local physical layer, and used for requesting retransmission of the faulty data packet. Due to factors such as a link delay, in a period from the determining reception of the faulty data packet by the local link layer to the retransmitting the faulty data packet by the remote node, the remote node continuously sends one or multiple data packets to a local, and the local link layer discards each data packet received by the local physical layer and received after the faulty data packet. A link layer of the remote node determines, according to the retry request, that a data packet needs to be retransmitted, and retransmits, through a physical layer of the remote node all data packets sent after the faulty data packet to the local.

In an existing QPI system, when a transmitted data packet is faulty, the link layer of the remote node retransmits all the data packets sent after the faulty data packet, including a data packet already sent to the local by the link layer of the remote node, thereby causing a waste of system bandwidth resources.

SUMMARY

The present invention provides a method, an apparatus, and a system for retransmitting a data packet in a quick path interconnect bus, so as to decrease system resources that need to be occupied in data packet retransmission, thereby facilitating improvement of utilization of the system resources.

The present invention provides a method for retransmitting a data packet in a quick path interconnect QPI bus, where the method includes: receiving a second data packet from a remote node, wherein the second data packet does not include a sequence number of the second data packet; starting a first counter, wherein an initial first count value of the first counter is 0; detecting each received second data packet, and if one second data packet is detected to be correct, buffering the second data packet detected to be correct, the first counter adds 1 to the first count value, sending the second reception acknowledgement information to the remote node, wherein the second reception acknowledgement information does not include a sequence number of the second data packet detected to be correct; if one second data packet is detected to be faulty, the first counter stops counting, starts a second counter, wherein an initial second count value of the second counter is 0, sending a first retry request to the remote node, wherein the first retry request includes the first count value, wherein the first count value denotes a sequence number of the second data packet detected to be faulty; receiving a new second data packet from the remote node after the second data packet is detected to be faulty, and detecting each new second data packet, if one second data packet is detected to be correct, buffering the second data packet detected to be correct and the second counter adds 1 to the second count value; after receiving a first retry response, detecting an initial second data packet behind the first retry response, if the initial second data packet is detected to be correct, sending the second reception acknowledgement information to the remote node, wherein the second reception acknowledgement information does not include a sequence number of the initial second data packet detected to be correct, the first counter adds the second count value to the first count value and the first counter restarts its count.

The present invention provides a node, where the node includes: a receiving module, configured to receive data from a remote node, wherein the data is a second data packet or a first retry response, wherein the second data packet does not include a sequence number of the second data packet; a receiving and decoding module, configured to start a first counter, wherein an initial first count value of the first counter is 0; detect each received second data packet, and if one second data packet is detected to be correct, buffer the second data packet detected to be correct to a receiving and buffering module, send decoding information of the second data packet detected to be correct to a system control module; the first counter adds 1 to the first count value; if one second data packet is detected to be faulty, instruct the receiving and buffering module to start a second counter, wherein an initial second count value of the second counter is 0 and the first counter stops counting; send the first count value to the system control module; the receiving and decoding module further configured to detect each new second data packet after the second data packet is detected to be faulty, if one second data packet is detected to be correct, buffer the second data packet detected to be correct to the receiving and buffering module, and the second counter adds 1 to the second count value; the receiving and decoding module further configured to detect an initial second data packet behind a first retry response, if the initial second data packet is detected to be correct, the first counter adds the second count value to the first count value and the first counter restarts its count; send decoding information of the initial second data packet to the system control module; the system control module, configured to send control information to a special data packet generating module according to decoding information of the second data packet detected to be correct, to instruct the special data packet generating module to generate the second reception acknowledgement information, wherein the second reception acknowledgement information does not include a sequence number of the second data packet detected to be correct; and send control information to the special data packet generating module according to the first count value to instruct the special data packet generating module to generate a first retry request, wherein the first retry request includes the first count value, wherein the first count value denotes a sequence number of the second data packet detected to be faulty; a sending module, configured to send the second reception acknowledgement information or the first retry request.

In the method for retransmitting the data packet in a quick path interconnect system, and, the node provided by the embodiments of the present invention, data packet retransmission processing is performed through the QPI bus. When the first node serves as a sending end, only the first data packet detected to be faulty is retransmitted to the second node, which avoids repeatedly sending, to the second node, a first data packet already correctly received by the second node, thereby saving the system resources that need to be occupied in the data packet retransmission, and further facilitating the improvement of the utilization of the system resources. When the first node serves as a receiving end, a first link layer of the first node buffers a second data packet correctly received in a period from sending the first retry request to receiving the first retry response, and after correctly receiving the second data packet retransmitted by the second node, sends the second data packet buffered in the foregoing period to the first protocol layer, which implements that packet loss does not occur in the first node in a case that the second node only retransmits the second data packet detected to be faulty, thereby ensuring reliability of data packet transmission based on the QPI bus.

BRIEF DESCRIPTION OF THE DRAWINGS

To illustrate the technical solutions in the embodiments of the present invention or in the prior art more clearly, accompanying drawings required for describing the embodiments or the prior art are briefly introduced in the following. The accompanying drawings in the following description are merely some embodiments of the present invention, and persons of ordinary skill in the art may further obtain other drawings according to these accompanying drawings without creative efforts.

DETAILED DESCRIPTION OF THE EMBODIMENTS

In the embodiments of the present invention, a first node and a second node perform communication based on a QPI bus, and an interface protocol layer between each end and the QPI bus includes a physical layer, a link layer, and a protocol layer. For convenience of description, in the embodiments of the present invention, protocol layers included in the first node are called: a first physical layer, a first link layer, and a first protocol layer; protocol layers included in the second node are called: a second physical layer, a second link layer, and a second protocol layer. A data packet, a retry request, a retry response, and the reception acknowledgment information that are sent by the first node are respectively called: a first data packet, a first retry request, a second retry response, and the second reception acknowledgment information; a data packet, a retry request, a retry response, and the reception acknowledgment information that are sent by the second node are respectively called: a second data packet, a second retry request, a first retry response, and the first reception acknowledgment information, which are not repeatedly described in the following. Optionally, in each protocol layer included in any one of the nodes, the physical layer is used for providing connection of a physical link and an interface with a specific electrical feature; the link layer is used for providing management of the physical link; and the protocol layer is used for providing data packet processing, for example, adopts a cache-coherent (Cache-Coherent, abbreviated as CC) protocol to process a data packet.

To make the objectives, technical solutions, and advantages of the embodiments of the present invention clearer, the technical solutions in the embodiments of the present invention are clearly and completely described in the following with reference to the accompanying drawings in the embodiments of the present invention. The embodiments to be described are merely part of rather than all of the embodiments of the present invention. All other embodiments obtained by persons of ordinary skill in the art based on the embodiments of the present invention without creative efforts shall fall within the protection scope of the present invention.

Sequence numbers in the following embodiments of the present invention are merely for description, and do not represent preference of the embodiments.

Figure 1:
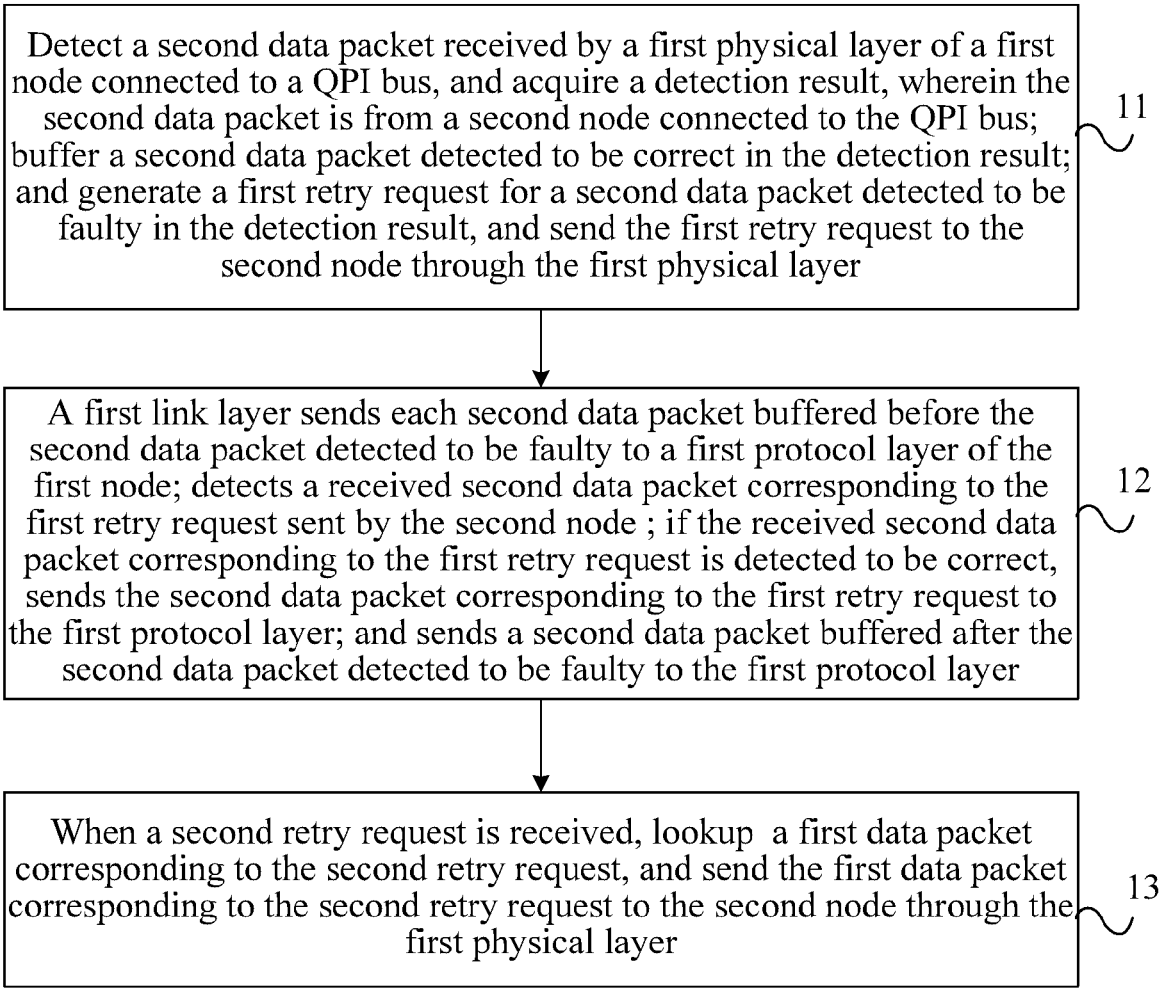
FIG. 1 is a flow chart of a method for retransmitting a data packet in a QPI bus according to a first embodiment of the present invention.

FIG. 1 is a flow chart of a method for retransmitting a data packet in a QPI bus according to a first embodiment of the present invention. This embodiment is described from the perspective of an executing method by a link layer of a certain QPI interface, and an executing subject of the method may be an apparatus corresponding to a link layer of a QPI interface of a first node connected to the QPI bus. In the embodiment of the present invention, assuming that a first node serves as a receiver, a second node serves as a sender. That is, the second node sends a second data packet sequentially to the first node, after receiving each second data packet, the first node sends the reception acknowledgment information, such as an acknowledgement (Ack), to the second node if the second data packet is detected to be correct, or send a first retry request to the second node if the second data packet is detected to be faulty. As shown in FIG. 1, the method includes:

11: Detect each second data packet received by a first physical layer of the first node connected to a QPI bus, and acquire a detection result, wherein the second data packet is from the second node connected to the QPI bus; buffer the second data packet detected to be correct in the detection result; and generate a first retry request for the second data packet detected to be faulty in the detection result, and send the first retry request to the second node through the first physical layer.

The first physical layer receives each second data packet sent by the second node sequentially, and then sends each received second data packet to a first link layer for detection. If a received second data packet is detected to be correct, the first link layer buffers the second data packet detected to be correct; if a received second data packet is detected to be faulty, the first link layer does not buffer the second data packet detected to be faulty, but generates a first retry request which is used for requesting retransmission of the data packet detected to be faulty from the second node. The first retry request is sent to the second node through the first physical layer.

Due to reasons such as data packet detection and bus transmission, a delay is caused to exist when the first node and the second node receive and send data packets. For example, a delay exists between the two when sending the first retry request to the second node by the first node and returning a first retry response and retransmitting a corresponding second data packet to the first node by the second node. In such a delay period, the second node does not know that the second data packet sent by the second node to the first node is faulty, so the second node continuously sends a second data packet sequentially to the first node. After receiving the data packet sent by the second node, the first physical layer of the first node forwards the data packet to the first link layer. The first link layer detects each second data packet and buffers the second data packet which is detected to be correct.

12: The first link layer sends each second data packet buffered before the second data packet detected to be faulty to a first protocol layer of the first node; detects a received second data packet corresponding to the first retry request sent by the second node, and if the received second data packet corresponding to the first retry request is detected to be correct, sends the second data packet corresponding to the first retry request to the first protocol layer; and sends each second data packet buffered after the second data packet detected to be faulty to the first protocol layer.

In an embodiment of the present invention, a data packet transmitted between the first node and the second node is different from a data packet in the prior art. A data packet in an embodiment of the present invention does not include a sequence number of the data packet. The first node sends the second reception acknowledgment information, such as an Ack, to the second node after receiving each second data packet, which is detected to be correct. In an embodiment of the present invention, the Ack is different from an Ack in the prior art since the Ack in an embodiment of the present invention does not include a sequence number corresponding to the second data packet detected to be correct. The length of the Ack in an embodiment of the present invention, for example, may be just one bit, and the Ack utilizes this bit to denote whether a second data packet is detected to be correct. For example, a second data packet is detected to be correct if the bit of an Ack is 1.

What is different from the prior art is that, in this embodiment, the first link layer does not discard the second data packets received in a period from sending the first retry request to the receiving the first retry response, but processes theses second data packets by adopting the foregoing method in step 11. After the second node receives the first retry request, what is retransmitted is merely the second data packet detected to be faulty. The first link layer sends the second data packets detected to be correct to the first protocol layer in batches. For example, the first link layer sends a second data packet buffered before the second data packet detected to be faulty to the first protocol layer; when receiving the retransmitted second data packet and it is detected to be correct, directly sends the second data packet to the first protocol layer; afterwards, sends a second data packet buffered after the second data packet detected to be faulty to the first protocol layer.

Optionally, if the first link layer receives the first retry response which is sent by the second node and corresponds to the first retry request, the first link layer detects an initial second data packet received after the first retry response; and if the initial second data packet is detected to be correct, sends the initial second data packet to the first protocol layer.

If the first node receives the initial second data packet detected to be correct, it indicates that the first node already correctly received the second data packet retransmitted by the second node. In this case, the first link layer of the first node may generate the second reception acknowledgment information, such as an Ack, and send the Ack to the second node through the first physical layer.

Optionally, the first link layer may also start a first counter, and an initial first count value of the first counter is 0. The first link layer detects each second data packet received from the second node, and the first counter adds 1 to the first count value if one second data packet is detected to be correct, otherwise the first counter stops counting if a certain second data packet is detected to be faulty. The first link layer starts a second counter, and an initial second count value of the second counter is 0. The first link layer generates a first retry request. The first retry request includes the first count value of the first counter at the time that a certain second data packet is detected to be faulty, and the first count value of the first counter at the time that a certain second data packet is detected to be faulty denotes a sequence number of the certain data packet detected to be faulty. The first retry request is used to request the second node to retransmit the certain data packet detected to be faulty. The first link layer continues to receive a new second data packet sequentially after the certain second data packet is detected to be faulty, and detects each new second data packet. The second counter adds 1 to the second count value if one new data packet is detected to be correct.

After receiving the first retry request, the second node suspends to send a second data packet, generates a first retry response according to the first retry request, and sends the first retry response to the first node. Then the second node lookups the second packet, which needs to be retransmitted according to the sequence number in the first retry request, and sends the second data packet, which needs to be retransmitted to the first node after sending the first retry response, and then continues to send a new second data packet sequentially.

After receiving the first retry response from the second node, the first link layer receives the second data packet, which needs to be retransmitted according to the first retry request. The first link layer detects the received second data packet which needs to be retransmitted and sends it to a protocol layer if it is detected to be correct, and then the first counter adds the second count value of the second counter to the first count value of the first counter, and the second count value of the second counter is reset to be 0. The first link layer generates the second reception acknowledgement information and sends it to the second node. In this embodiment, the second reception acknowledgement information may be an Ack.

The first link layer may also start a third counter, select buffered second data packets in sequence, and perform accumulated counting on a third count value according to the number of the selected second data packets; and till the third count value is equal to the first count value, the first link layer sends the selected second data packets to the first protocol layer. The method further includes after the second data packet corresponding to the first retry request is sent to the first protocol layer, adding, by the third counter, 1 to the third count value.

Further, in an embodiment of the present invention, the first node may serve as a sender, and the second node may serve as a receiver. In this scenario, the first node sends a first data packet to the second node. After receiving the first data packet, the second node may send the first reception acknowledgment information (such as an Ack), or a second retry request. If the first node receives the second retry request, the first node sends a second retry response to the second node, and the method further comprising:

13: When a second retry request is received, lookup a first data packet corresponding to the second retry request, and send the first data packet corresponding to the second retry request to the second node through the first physical layer.

In an embodiment of the present invention, after receiving a second retry request, the first link layer of the first node will stop sending a new first data packet, generates a second retry response according to the second retry request, and then lookups the first data packet corresponding to the second retry request, that is the first data packet, which needs to be retransmitted, sends the first data packet which needs to be retransmitted to the second node, and then sends a new first data packet.

What is different from the prior art is that, in this embodiment, only the first data packet corresponding to the second retry request is retransmitted to the second node, rather than all first data packets sent after the first data packet corresponding to the second retry request, thereby saving system resources that need to be occupied in data packet retransmission. In this embodiment, after the first data packet corresponding to the second retry request is retransmitted, a first data packet to be sent may be continuously sent to the second node.

In the method provided by this embodiment, data packet retransmission processing is performed through the QPI bus. When the first node serves as a sending end, only the first data packet detected to be faulty is retransmitted to the second node, which avoids repeatedly sending, to the second node, a first data packet already correctly received by the second node, thereby saving the system resources that need to be occupied in the data packet retransmission, and further facilitating improvement of utilization of the system resources. When the first node serves as a receiving end, the first link layer of the first node buffers a second data packet correctly received in a period from sending the first retry request to receiving the first retry response, and after correctly receiving the second data packet retransmitted by the second node, sends the second data packet buffered in the foregoing period to the first protocol layer, which implements that packet loss does not occur in the first node in a case that the second node only retransmits the second data packet detected to be faulty, thereby ensuring reliability of data packet transmission based on the QPI bus. Further, in this embodiment of the present invention, a data packet transmitted between the first node and the second node is different from a data packet in the prior art since the data packet in the prior art includes a sequence number of the data packet, and a reception acknowledgement information, such as an Ack, also does not include a sequence number corresponding to a data packet. Doing so saves the system resources and further facilitates improvement of utilization of the system resources.

Figure 2:
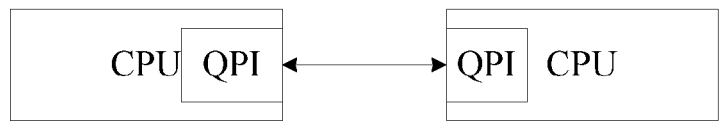
FIG. 2 shows an example 1 of an application scenario of a QPI bus according to an embodiment of the present invention.
Figure 3:
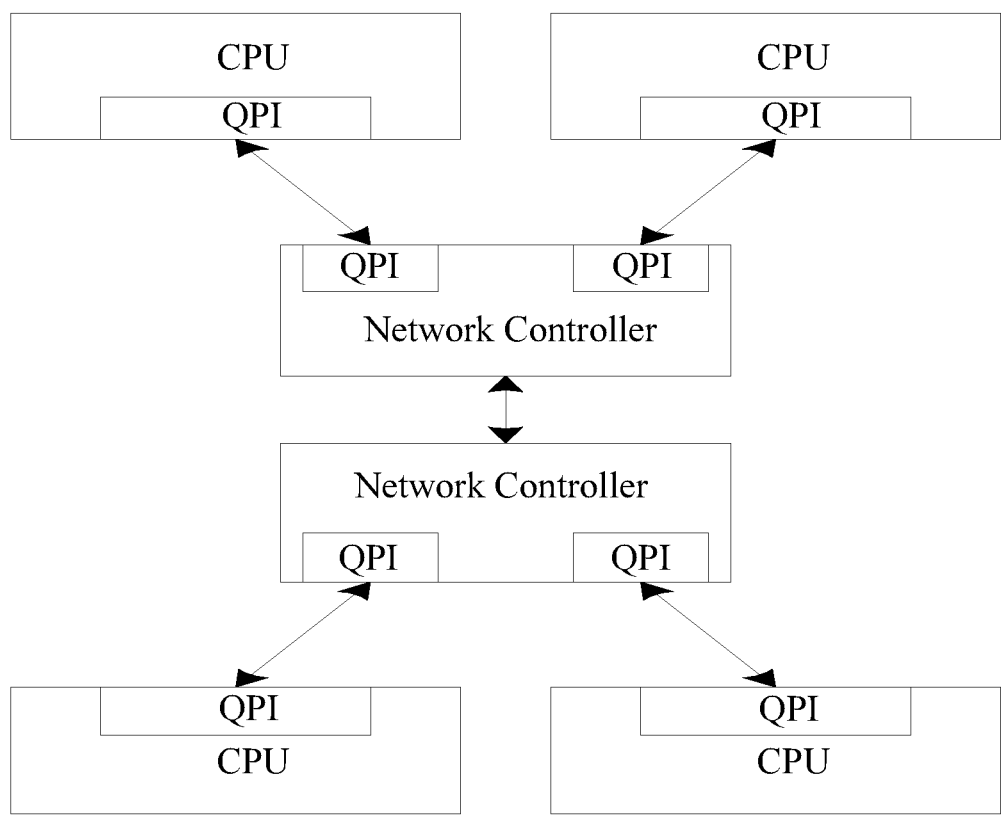
FIG. 3 shows an example 2 of an application scenario of a QPI bus according to an embodiment of the present invention.

The QPI bus is widely applied to node interconnection between multi-processor platforms in a computer network. FIG. 2 shows an example 1 of an application scenario of a QPI bus according to an embodiment of the present invention. As shown in FIG. 2, different CPUs in a multi-processor platform may be interconnected through the QPI bus, so as to implement reliable data transmission between the interconnected CPUs. When the number of the interconnected CPUs is large, a method shown in FIG. 3 may be adopted, where different CPUs are interconnected through a network controller, each CPU is connected to the network controller through a QPI bus, and data packets between different interconnected CPUs are forwarded by the network controller. It may be understood that, FIG. 2 and FIG. 3 merely show examples of the application scenarios of the QPI bus, which shall not be construed as a limitation to the essence of the technical solutions of the embodiment of the present invention.

Figure 4:
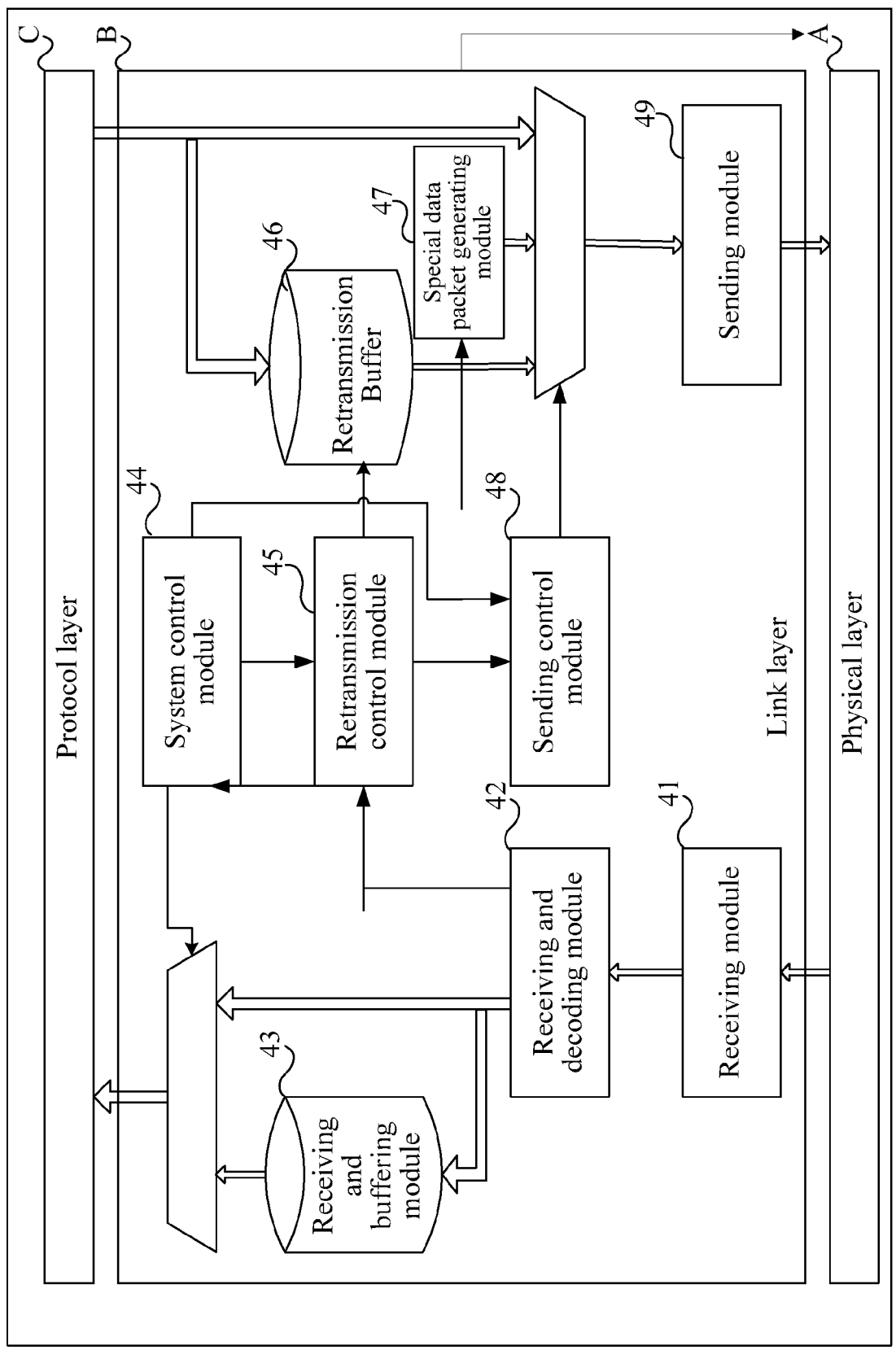
FIG. 4 is a schematic structural diagram of a link layer of a QPI interface according to a second embodiment of the present invention.

FIG. 4 is a schematic structural diagram of a link layer of a QPI interface according to a second embodiment of the present invention. A QPI interface module includes a physical layer A, a link layer B, and a protocol layer C. A structure of the link layer B is as shown in FIG. 4 and includes: a receiving module (Rx) 41, a receiving and decoding module (Rx_decode) 42, a receiving and buffering module (Rx_temp_buf) 43, a system control module (Sys_ctrl) 44, a retransmission control module (Retry_ctrl) 45, a retransmission buffer (Retry_buf) 46, a special data packet generating module (Gen_sp) 47, a sending control module (Tx_ctrl) 48, and a sending module (Tx) 49.

The receiving module 41 is one of interfaces of the link layer B and the physical layer A, and configured to receive a second data packet from the physical layer A. As mentioned above, the second data packet does not include a sequence number. Wherein, the physical layer A is coupled to a physical layer of a remote node, and is configured to receive the second data packet from the physical layer of the remote node. The receiving module 41 is further configured to receive a second retry request from the remote node, the second retry request includes the sequence number of a first data packet, which needs to be retransmitted as requested by the remote node.

The receiving and decoding module 42 is configured to detect the second data packet received by the receiving module 41; if the second data packet is detected to be correct, buffer the second data packet detected to be correct in the receiving and buffering module 43 or directly send the second data packet detected to be correct to the protocol layer C, and send a decoding result of the second data packet detected to be correct to the system control module 44; and if the second data packet is detected to be faulty, send information of the second data packet detected to be faulty to the system control module 44. The receiving and decoding module 42 is further configured to decode the second retry request, and then send the second retry request to the retransmission control module 45.

The receiving and buffering module 43 is configured to buffer second data packets detected to be correct by the receiving and decoding module 42 in sequence.

The system control module 44 is configured to send the second data packets buffered by the receiving and buffering module 43 to the protocol layer C, and send corresponding control information to the retransmission control module 45, the special data packet generating module 47, and the sending control module 48. Wherein the system control module 44 is configured to generate control information according to the information of the second data packet detected to be faulty, and send the control information to the special data packet generating module 47.

The retransmission control module 45 is configured to lookup, in the retransmission buffer 46, a first data packet that needs to be retransmitted, and send control information, which is of the first data packet, which needs to be retransmitted and acquired from the retransmission buffer 46 to the sending control module 48.

The retransmission buffer 46 is configured to buffer the first data packet from the protocol layer C.

The special data packet generating module 47 may be configured to, according to control information of the system control module 44, generate a special data packet, such as a first retry request (Retry_Request), the second reception acknowledgment information (Ack), and a second retry response (Retry_Response), wherein the first retry request includes the sequence number of the second data packet which needs to be retransmitted.

The sending control module 48 is configured to select, from the retransmission buffer 46, the special data packet generating module 47, or the protocol layer C, a data packet that needs to be sent.

The sending module 49 is one of the interfaces of the link layer B and the physical layer A, and is configured to send the data packet selected by the sending control module 48 to the physical layer A.

Figure 5:
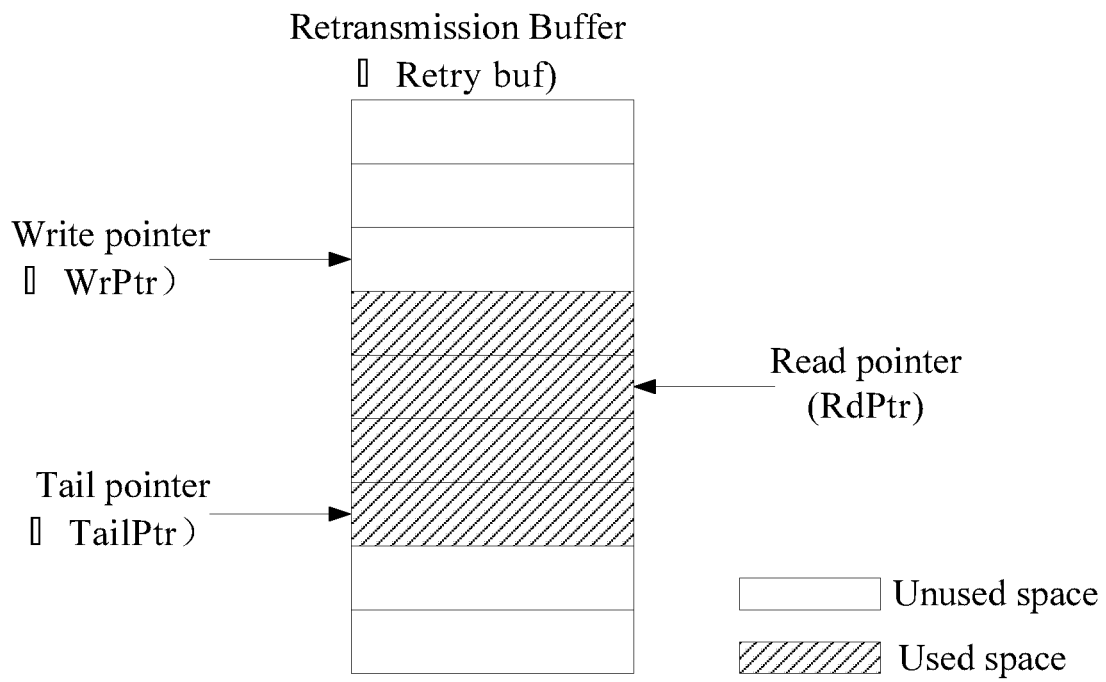
FIG. 5 is a schematic diagram of a state of a retransmission buffer in FIG. 4.

FIG. 5 is a schematic diagram of a state of a retransmission buffer in FIG. 4. As shown in FIG. 5, the retransmission buffer may include multiple storage units, and each storage unit may be configured to buffer a data packet. Pointers of three kinds are involved in the retransmission buffer: a write pointer (WrPtr), a read pointer (RdPtr), and a tail pointer (TailPtr).

A storage unit to which the WrPtr points is configured to store the first data packet to be received by the retransmission buffer. When a certain new data packet is sent by the sending module, the new data packet is simultaneously buffered in the storage unit to which the WrPtr currently points, and afterwards, 1 is added to the WrPtr to point to a next idle storage unit.

A tail address to which the TailPtr points corresponds to a data packet sent earliest and currently buffered by the retransmission buffer. At each time when the first reception acknowledgment information sent by a second node is received, a first data packet stored by a storage unit to which the TailPtr currently points is released, and 1 is added to the TailPtr. A storage unit between the WrPtr and the TailPtr is storage space already used by the retransmission buffer. Another storage unit is storage space not used by the retransmission buffer.

A storage unit to which the RdPtr points is configured to store a first data packet corresponding to the second retry request which needs to be retransmitted.

In the foregoing technical solution, optionally, the receiving and decoding module 42 may be set with a first counter (Pkt), the receiving and buffering module 43 may be set with a second counter (Tem_Pkt), and the system control module 44 may be set with a third counter (Cnt). Initial count values of the three counters are all 0.

When beginning to receive a second data packet from the receiving module 41, the receiving and decoding module 42 starts the first counter and the first counter begins to count, the initial value of the first counting value (Pkt_num) is 0. The receiving and decoding module 42 detects each second data packet. The first counter adds 1 to the Pkt_num if one second data packet is detected to be correct, and the receiving and decoding module 42 buffers the second data packet detected to be correct to the receiving and buffering module 43. If one second data packet is detected to be faulty, the first counter stops counting, the receiving and decoding module 42 sends the Pkt_num to the system control module 44 and instructs the receiving and buffering module 43 to start a second counter. The receiving and decoding module 42 continues to receive a new second data packet sequentially from the receiving module 41, and detects each new second data packet. If the new second data packet is detected to be correct, the receiving and decoding module 42 buffers the new second data packet to the receiving and buffering module 43 and the second counter adds 1 to the second count value. The system control module 44 generates control information according to the Pkt_num and sends the control information to the special data packet generating module 47. The special data packet generating module 47 generates a first retry request according to the control information. The first retry request includes the Pkt_num, wherein the Pkt_num is the sequence number of the second data packet, which needs to be retransmitted.

When correctly receiving a second data packet corresponding to Pkt_num, which is retransmitted by a remote node, the receiving and decoding module 42 sends this second data packet to a protocol layer C directly, and acquires a current count value (Tem_Pkt_num) of the second counter, accumulates Tem_Pkt_num to the current first count value Pkt_num of the first counter, and afterwards, recovers the counting of the first counter. The receiving and buffering module 43 resets the second counter.

When beginning to receive decoding information of the second data packet from the receiving and decoding module 42, the system control module 44 starts the third counter; wherein when decoding information of one second data packet is received each time, 1 is added to a value of the third counter.

In the following, with reference to FIG. 4 to FIG. 5, interaction between a first node and a second node of a QPI bus, and a processing procedure by a link layer for receiving and sending a data packet in the first node are taken as examples to illustrate the technical solutions of the embodiments of the present invention in detail. Each node includes a QPI interface shown in FIG. 4, and exchanges a data packet with another node through a QPI bus with the QPI interface.

Figure 6:
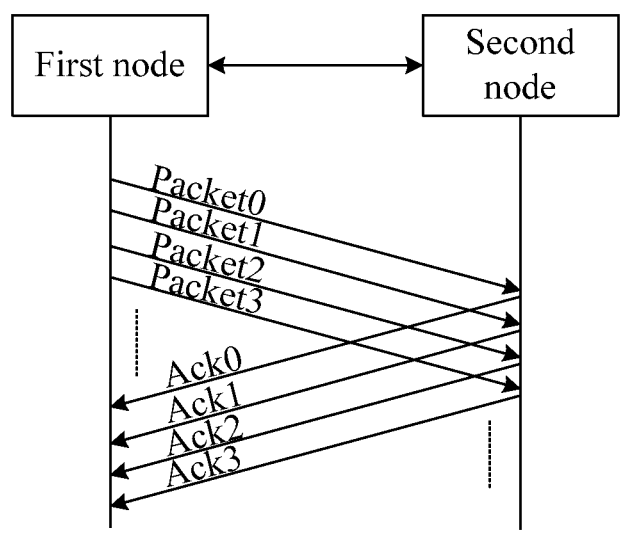
FIG. 6 is a schematic diagram of a switching stream of a normal data packet in a QPI bus according to a third embodiment of the present invention.

FIG. 6 is a schematic diagram of a switching stream of a normal data packet in a QPI bus according to a third embodiment of the present invention. A first node sends a certain first data packet to a second node, if the second node correctly receives the certain first data packet, the second node may feedback the first acknowledgment response information to the first node, for instructing the first node that the certain first data packet is already correctly received.

An optional implementation manner is, for example, as follows: The first node sends a plurality of first data packets Packt0, Packt1, Packt2, Packt3 and so on, to the second node;

after correct reception, the second node correspondingly sends the first reception acknowledgment information, such as Ack0, Ack1, Ack2, Ack3 and so on. In an embodiment of the present invention, the Ack is different from an Ack in the prior art since the Ack in an embodiment of the present invention does not include a sequence number corresponding to a second data packet detected to be correct. The length of the Ack in an embodiment of the present invention, for example, may be just one bit. The Ack utilizes this bit to denote whether a second data packet is detected to be correct. For example, a second data packet is detected to be correct if the bit of an Ack is 1.

For moving of a WrPtr and a TailPtr of a retransmission buffer in a link layer of the first node, reference may be made to the illustration in FIG. 5. For example, after the first node completes sending a certain data packet, such as Packet2, 1 is added to a value of the WrPtr; when the first node receives the certain reception acknowledgment information, such as Ack0, the data packet Packet0 is buffered in a storage unit to which the TailPtr currently points is deleted, and 1 is added to a value of the TailPtr.

Figure 7:
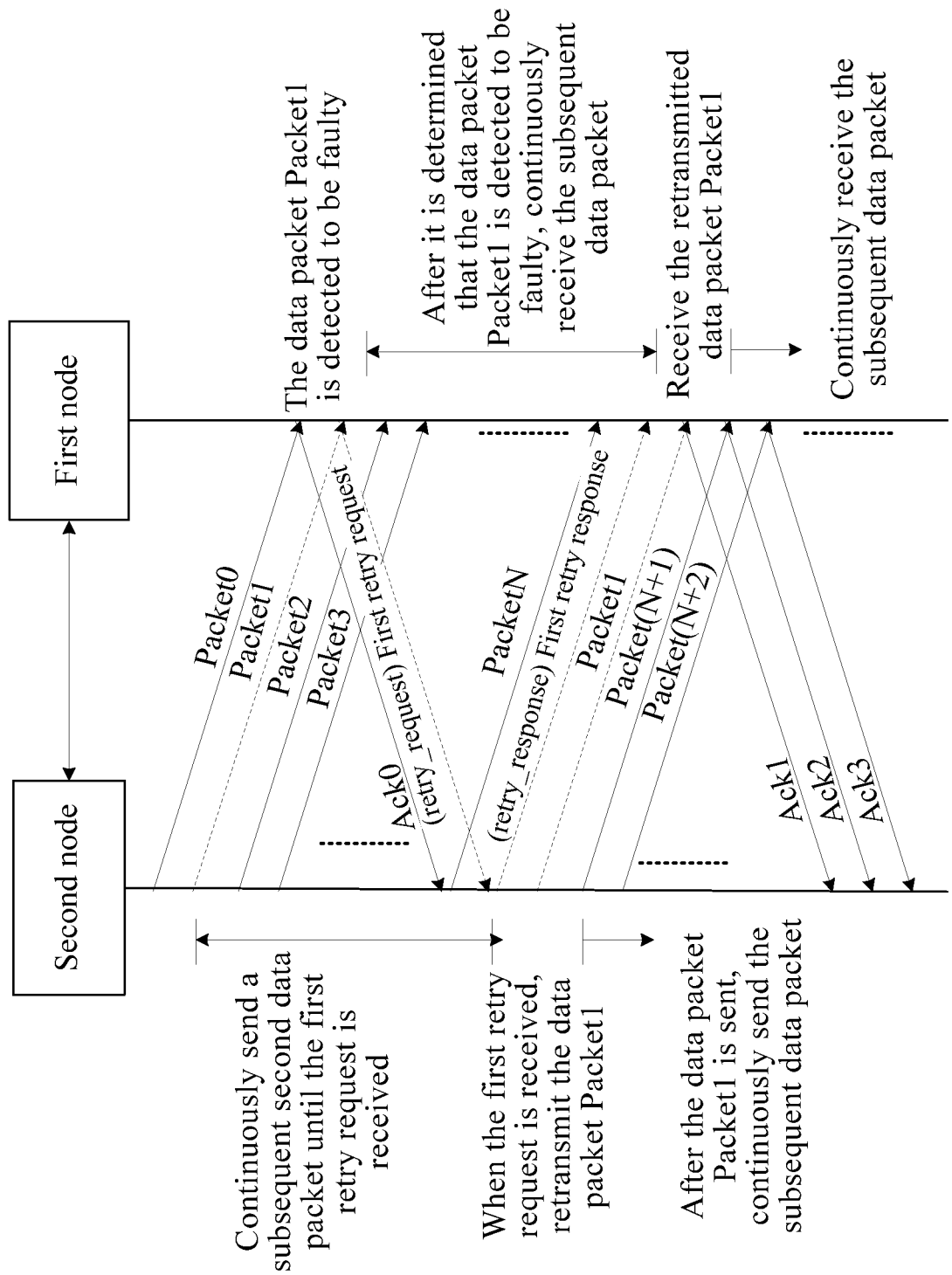
FIG. 7 is a schematic diagram of a switching stream of data packet retransmission in a QPI bus according to a fourth embodiment of the present invention.

FIG. 7 is a schematic diagram of a switching stream of data packet retransmission in a QPI bus according to a fourth embodiment of the present invention. In FIG. 7, assuming that a first node has detected that a data packet Packet1 sent to the first node by a second node is faulty, the first node generates a first retry request (Retry_Request) and sent the first retry request to the second node, where the first retry request is used for requesting the second node to retransmit the data packet Packet1.

Assuming that, after completing sending of a data packet PacketN, the second node receives the first retry request, the second node then stops sending a new second data packet, sends a first retry response (Retry_Response) to the first node and retransmits the data packet Packet1, where the retransmitted data packet Packet1 is an initial data packet sent by the second node after the first retry response; after sending the data packet Packet1, the second node continuously sends data packets, PacketN+1, PacketN+2 . . . .

After the first node has detected the faulty data packet Packet1, the first node still continuously receives data packets, Packet2 . . . PacketN, sent by the second node, and buffers these received data packets, Packet2 . . . PacketN. When the first node receives the first retry response and detects that the initial data packet, namely Packet1, received after the first retry response is correct, the first node continuously receives subsequent data packets PacketN+1, PacketN+2 . . . ; otherwise, the first node repeatedly generates and sends the first retry request for requesting the retransmission of the data packet Packet1, until the first node correctly receives the retransmitted data packet Packet1.

Figure 8A:
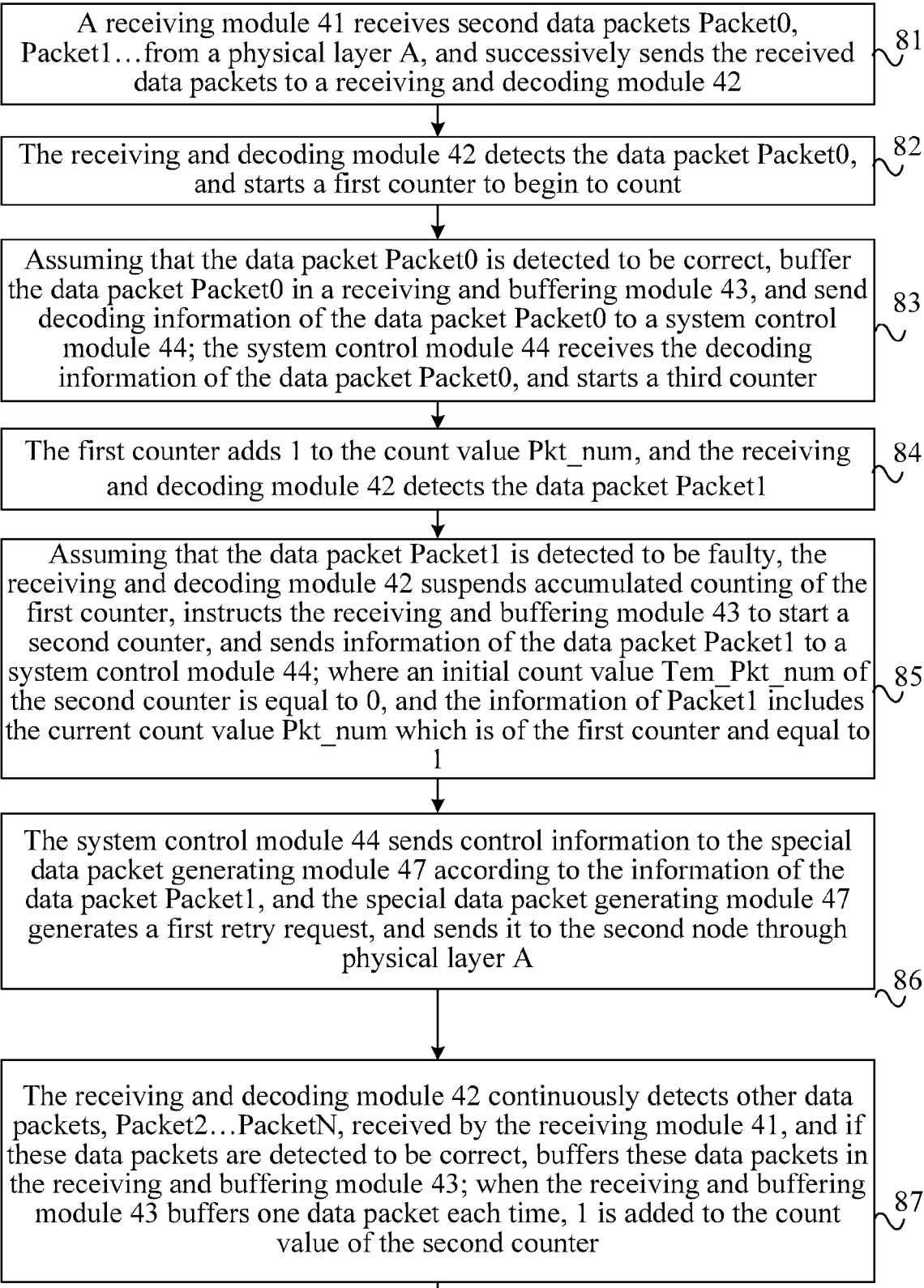
FIGS. 8A and 8B are a flow chart of a processing method by a link layer for receiving a data packet in a first node according to the fourth embodiment of the present invention.
Figure 8B:
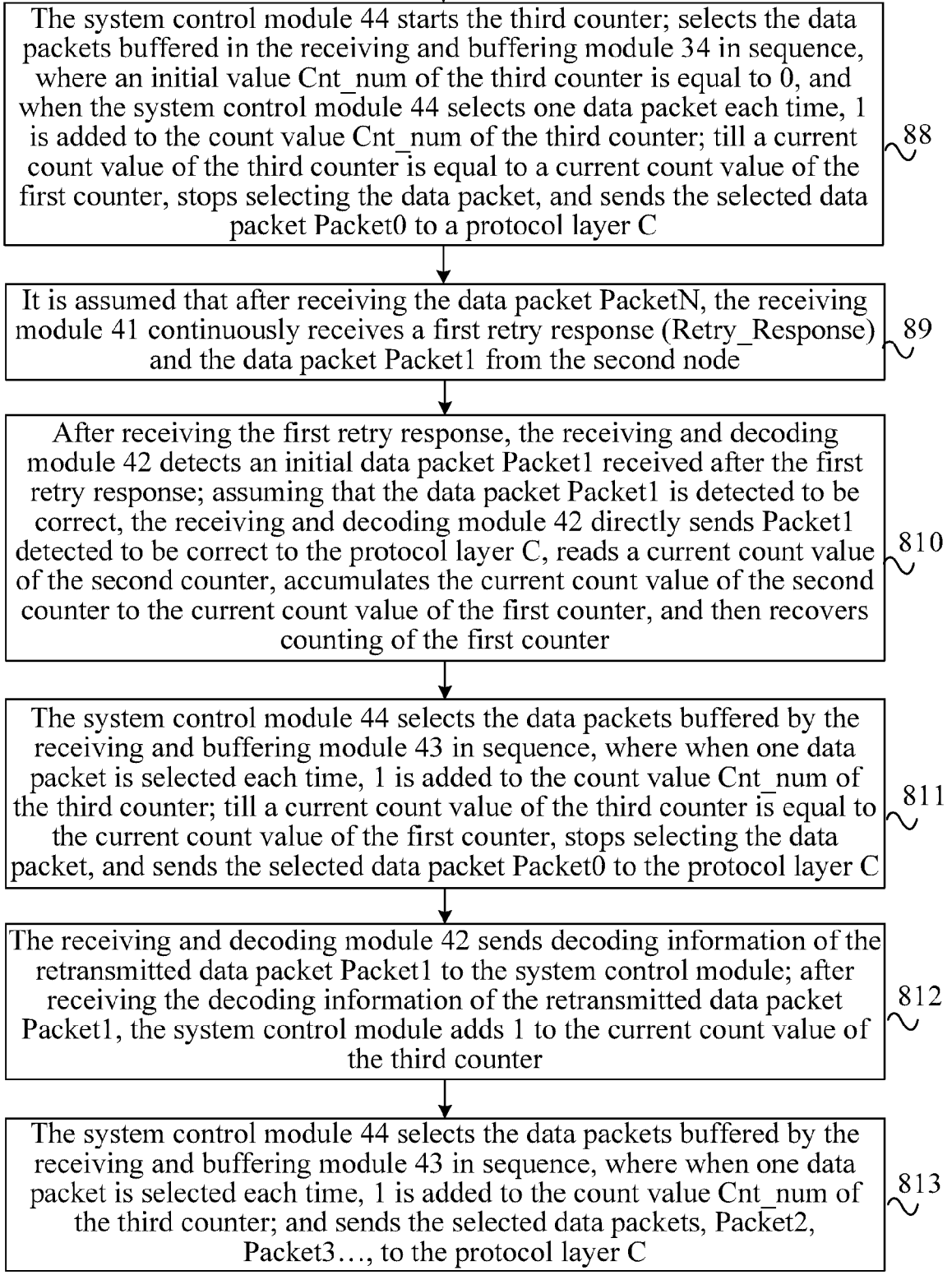

FIGS. 8A and 8B are a flow chart of a processing method by a link layer for receiving a data packet in a first node according to the fourth embodiment of the present invention. Referring to FIG. 4 to FIG. 5, and FIG. 7 to FIGS. 8A and 8B, the processing method by the link layer of the first node serving as a data receiver includes:

81: A receiving module 41 receives second data packets Packet0, Packet1 . . . from a physical layer A, and successively sends the received data packets to a receiving and decoding module 42.

82: The receiving and decoding module 42 detects the data packet Packet0, and starts a first counter to begin to count, where an initial count value Pkt_num of the first counter is equal to 0.

83: Assuming that the data packet Packet0 is detected to be correct, buffer the data packet Packet0 in a receiving and buffering module 43, and send decoding information of the data packet Packet0 to a system control module 44. The system control module 44 receives the decoding information of the data packet Packet0, and starts a third counter, where an initial value (Cnt_num) of the third counter is equal to 0. The system control module 44 sends control information to the special data packet generating module 47 according to the decoding information of the data packet Packet0, and the special data packet generating module 47 generates a second reception acknowledgement information, such as Ack0, and sends it to the second node through physical layer A.

84: The first counter adds 1 to the count value Pkt_num, and the receiving and decoding module 42 detects the data packet Packet1.

85: Assuming that the data packet Packet1 is detected to be faulty, the receiving and decoding module 42 suspends accumulated counting of the first counter, instructs the receiving and buffering module 43 to start a second counter, and sends information of the data packet Packet1 to a system control module 44 where an initial count value Tem_Pkt_num of the second counter is equal to 0, and the information of Packet1 includes the current Pkt_num which is of the first counter and equal to 1, the first count value denotes the sequence number of Packet1.

86: The system control module 44 sends control information to the special data packet generating module 47 according to the information of the data packet Packet1, such as the first count value, and the special data packet generating module 47 generates a first retry request, and sends it to the second node through physical layer A.

87: The receiving and decoding module 42 continuously detects other data packets, Packet2 . . . PacketN, received by the receiving module 41, and if these data packets are detected to be correct, buffers these data packets in the receiving and buffering module 43 when the receiving and buffering module 43 buffers one data packet each time, 1 is added to the count value of the second counter.

88: The system control module 44 starts the third counter; selects the data packets buffered in the receiving and buffering module 34 in sequence, where an initial value Cnt_num of the third counter is equal to 0, and when the system control module 44 selects one data packet each time, 1 is added to the count value Cnt_num of the third counter till a current count value of the third counter is equal to a current count value of the first counter, stops selecting the data packet, and sends the selected data packet Packet0 to a protocol layer C.

89: It is assumed that after receiving the data packet PacketN, the receiving module 41 continuously receives a first retry response (Retry_Response) and the data packet Packet1 from the second node.

810: After receiving the first retry response, the receiving and decoding module 42 detects an initial data packet Packet1 received after the first retry response assuming that the data packet Packet1 is detected to be correct, the receiving and decoding module 42 directly sends Packet1 detected to be correct to the protocol layer C, reads a current count value of the second counter, accumulates the current count value of the second counter to the current count value of the first counter, and then recovers counting of the first counter.

811: The system control module 44 selects the data packets buffered by the receiving and buffering module 43 in sequence, where when one data packet is selected each time, 1 is added to the count value Cnt_num of the third counter till a current count value of the third counter is equal to a current count value of the first counter, stops selecting the data packet, and sends the selected data packet Packet0 to the protocol layer C.

812: The receiving and decoding module 42 sends decoding information of the retransmitted data packet Packet1 to the system control module 44 after receiving the decoding information of the retransmitted data packet Packet1, the system control module 44 adds 1 to the current count value of the third counter. The system control module 44 sends control information to the special data packet generating module 47 according to the decoding information of the data packet Packet1, and the special data packet generating module 47 generates the second reception acknowledgement information, such as Ack1, and sends it to the second node through physical layer A.

813: The system control module 44 selects the data packets buffered by the receiving and buffering module 43 in sequence, where when one data packet is selected each time, 1 is added to the count value Cnt_num of the third counter and sends the selected data packets, Packet2, Packet3 . . . , to the protocol layer C.

Figure 9:
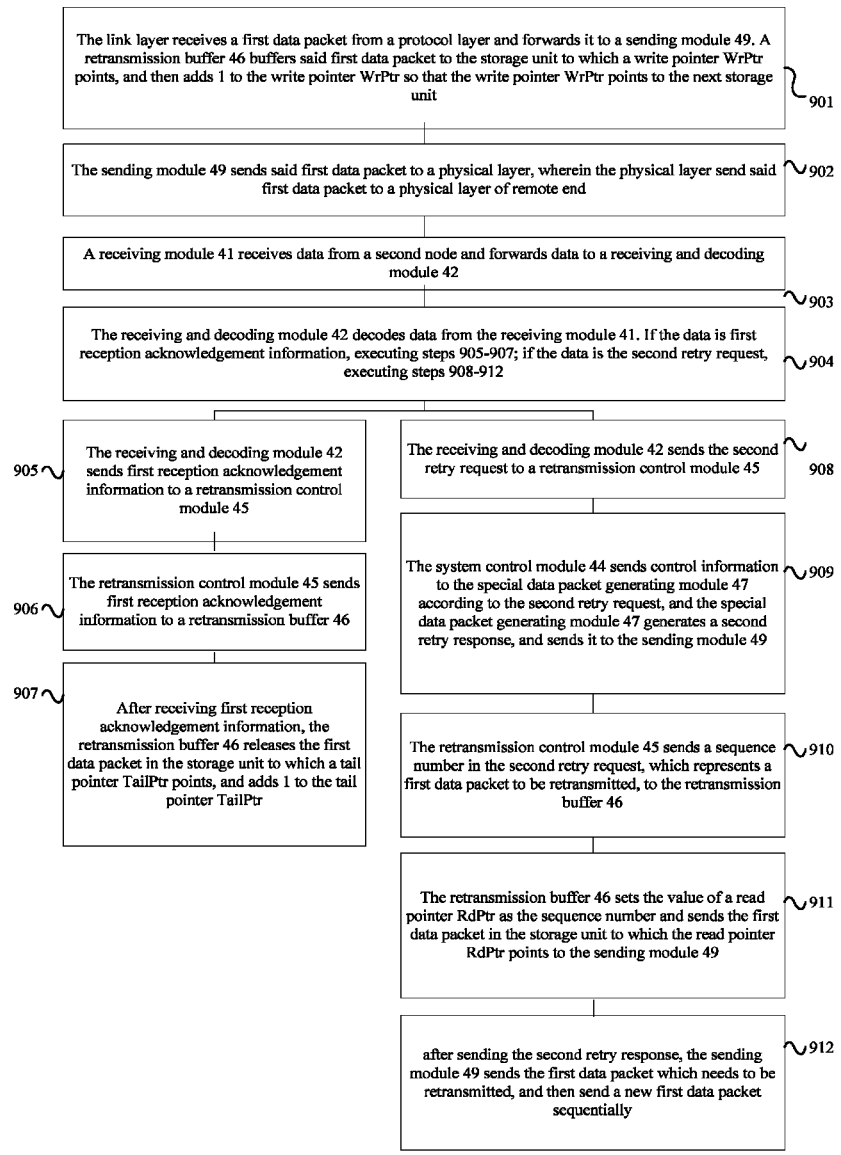
FIG. 9 is a flow chart of a processing method by a link layer for sending a data packet in a first node according to an embodiment of the present invention.

FIG. 9 is a flow chart of a processing method by a link layer for sending a data packet in a first node according to the fourth embodiment of the present invention. Referring to FIG. 4 to FIG. 5, the processing method by the link layer of the first node serving as a data sender includes:

901: The link layer receives a first data packet from a protocol layer and forwards it to a sending module 49. A retransmission buffer 46 buffers said first data packet to the storage unit to which a WrPtr points, and then adds 1 to the WrPtr so that the WrPtr points to the next storage unit.

902: The sending module 49 sends said first data packet to a physical layer, wherein the physical layer sends said first data packet to a physical layer of remote node.

903: A receiving module 41 receives data from a second node and forwards data to a receiving and decoding module 42, said data may be a second data packet, or a second retry request, or a first retry response, or the first reception acknowledgement information.

904: The receiving and decoding module 42 decodes data from the receiving module 41. If the data is the first reception acknowledgement information, steps 905-907 are executed. If the data is the second retry request, steps 908-912 are executed.

905: The receiving and decoding module 42 sends the first reception acknowledgement information to a retransmission control module 45.

906: The retransmission control module 45 sends the first reception acknowledgement information to a retransmission buffer 46.

907: After receiving the first reception acknowledgement information, the retransmission buffer 46 releases the first data packet in the storage unit to which a TailPtr points, and adds 1 to the TailPtr.

908: The receiving and decoding module 42 sends the second retry request to a retransmission control module 45.

909: The system control module 44 sends control information to the special data packet generating module 47 according to the second retry request, and the special data packet generating module 47 generates a second retry response, and sends it to the sending module 49.

910: The retransmission control module 45 sends a sequence number in the second retry request, which represents a first data packet to be retransmitted, to the retransmission buffer 46.

911: The retransmission buffer 46 sets the value of a RdPtr as the sequence number, wherein the first data packet stored in the storage unit to which the RdPtr points is the first data packet, which needs to be retransmitted. The retransmission buffer 46 sends the first data packet in the storage unit to which the RdPtr points to the sending module 49.

912: After sending the second retry response, the sending module 49 sends the first data packet, which needs to be retransmitted, and then send a new first data packet sequentially.

In this embodiment, the data packet retransmission processing is performed based on the QPI bus. When the first node serves as a sender, only a first data packet detected to be faulty is retransmitted to the second node, which avoids repeatedly sending, to the second node, a first data packet already correctly received by the second node, thereby saving system resources that need to be occupied in the data packet retransmission, and further facilitating improvement of utilization of the system resources. When the first node serves as a receiver, a first link layer of the first node buffers a second data packet correctly received in a period from sending a first retry request to receiving the first retry response, and after correctly receiving the second data packet retransmitted by the second node, sends the second data packet buffered in the foregoing period to a first protocol layer, which implements that packet loss does not occur in the first node in a case that the second node only retransmits a second data packet detected to be faulty, thereby ensuring reliability of the data packet transmission based on the QPI bus.

An embodiment of the present invention further provides a system for retransmitting a data packet in a QPI bus. The system includes at least two nodes, where different nodes are connected through the QPI bus, and each node is set with the link layer shown in FIG. 4. Reference may be made to the description of the embodiment above for a specific structure and effect of the link layer, and details are not repeatedly described here. An optional implementation manner is, for example, as follows: The system provided by this embodiment may be a certain multi-processor system. The multi-processor system includes multiple CPUs, and each CPU is set with a QPI interface; a link layer of the QPI interface has the structure of the link layer shown in FIG. 4, and different CPUs are connected by adopting the QPI bus.

It can be understood that, modules in the apparatus according to the embodiment may be distributed in the apparatus provided by the embodiment according to the description of the embodiment, and may also be divided, according to a function that needs to be implemented by a certain module, into a plurality of modules for implementing a function of each portion; or functions of the several modules provided by the apparatus in the embodiment are combined into one module for implementation, which is not limited in the embodiment of the present invention.

Persons of ordinary skill in the art should understand that all or part of the steps of the foregoing method embodiments may be implemented by a program instructing relevant hardware. The foregoing program may be stored in a computer readable storage medium. When the program is run, the steps of the foregoing method embodiments are performed. The storage medium includes any medium that is capable of storing program codes, such as a read only memory (ROM), a random access memory (RAM), a magnetic disk, and an optical disk.

Finally, it should be noted that the foregoing embodiments are intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments or make equivalent replacements to part of the technical features of the technical solutions; however, these modifications or replacements do not make the essence of the corresponding technical solutions depart from the spirit and scope of the technical solutions of the embodiments of the present invention.

What is claimed is:

1. A method for retransmitting a data packet in a quick path interconnect (QPI) bus, the method comprising:
   receiving a plurality of second data packets from a remote node, wherein the second data packets do not include a sequence number of the second data packets;
   starting a first counter, wherein an initial first count value of the first counter is 0;
   determining whether each second data packet is correct;
   when one of the second data packets is correct, buffering the one second data packet, adding 1 to the first count value, and sending second reception acknowledgement information to the remote node, wherein the second reception acknowledgement information does not include the sequence number of the one second data packet determined to be correct;
   when one of the second data packets is not correct, stopping the first counter from counting, starting a second counter, wherein an initial second count value of the second counter is 0, and sending a first retry request to the remote node, wherein the first retry request includes the first count value, and wherein the first count value denotes a sequence number of the incorrect second data packet;
   receiving a new second data packet from the remote node after the second data packet is determined to be incorrect;
   determining whether the new second data packet is correct;
   when the new second data packet is determined to be correct, buffering the new second data packet and adding 1 to the second count value;
   after receiving a first retry response, determining whether an initial second data packet behind the first retry response is correct; and
   when the initial second data packet is determined to be correct, sending second reception acknowledgement information to the remote node, wherein the second reception acknowledgement information does not include the sequence number of the initial second data packet determined to be correct, adding the second count value to the first count value, and restarting the first counter.

2. The method according to claim 1, further comprising sending second reception acknowledgement information to the remote node corresponding to the new second data packet, wherein the second reception acknowledgement information does not include the sequence number of the new second data packet.

3. The method according to claim 1, further comprising:
   sending a first data packet to the remote node;
   buffering the first data packet in a retransmission buffer, wherein the first data packet does not include a sequence number of the first data packet;
   when receiving a second retry request from the remote node, wherein the second retry request includes the sequence number of the first data packet that needs to be retransmitted, looking up the first data packet that needs to be retransmitted in the retransmission buffer according to the sequence number of the first data packet that needs to be retransmitted, sending a second retry response to the remote node, and sending the first data packet that needs to be retransmitted after sending the second retry response; and
   sending a new first data packet.

4. The method according to claim 3, wherein the retransmission buffer includes a write pointer, and wherein buffering the first data packet in the retransmission buffer comprises:
   buffering, by the retransmission buffer, the first data packet in a storage unit to which the write pointer points; and
   adding 1 to the write pointer to point to a next storage unit.

5. The method according to claim 4, wherein the retransmission buffer includes a tail pointer, and wherein the method further comprises:
   after receiving first reception acknowledgement information from the remote node, releasing, by the retransmission buffer, the first data packet stored by the storage unit to which the tail pointer points; and
   adding 1 to the tail pointer.

6. A node comprising:
   a receiving module configured to receive data from a remote node, wherein the data includes a plurality of second data packets or a first retry response, and wherein the second data packets do not include a sequence number of the second data packets;
   a receiving and decoding module configured to:
   start a first counter, wherein an initial first count value of the first counter is 0; determine whether each second data packet is correct; and
   when one of the second data packets is correct, buffer the one second data packet to a receiving and buffering module, send decoding information of the one second data packet to a system control module;
   adding 1 to the first count value;
   when one of the second data packets is determined to be incorrect, instruct the receiving and buffering module to start a second counter, wherein an initial second count value of the second counter is 0, and stopping the first counter;
   send the first count value to the system control module;
   the receiving module, is further configured to receive a new second data packet from the remote node;
   the receiving and decoding module further configured to determine the new second data packet;
   when the new second data packet is determined to be correct, buffer the new second data packet to the receiving and buffering module, and adding 1 to the second count value;
   determine whether an initial second data packet behind the first retry response is correct,
   when the initial second data packet is determined to be correct, adding the second count value to the first count value and restarting the first counter; and
   send decoding information of the initial second data packet to the system control module, wherein the system control module is configured to:
   send control information to a special data packet generating module according to decoding information of the second data packet determined to be correct to instruct a special data packet generating module to generate second reception acknowledgement information, wherein the second reception acknowledgement information does not include a sequence number of the second data packet determined to be correct; and
   send control information to the special data packet generating module according to the first count value to instruct the special data packet generating module to generate a first retry request, wherein the first retry request includes the first count value, and wherein the first count value denotes the sequence number of the second data packet determined to be incorrect; and a sending module configured to send the second reception acknowledgement information or the first retry request.

7. The node according to claim 6, wherein the receiving and decoding module is further configured to send decoding information of the new second data packet to the system control module, wherein the system control module is further configured to send control information to the special data packet generating module according to the decoding information of the new second data packet to instruct the special data packet generating module to generate second reception acknowledgement information, wherein the second reception acknowledgement information does not include a sequence number of the new second data packet, and the sending module is further configured to send the second reception acknowledgement information to the remote node.

8. The node according to claim 6, further comprising:
a retransmission control module; and
a retransmission buffer,
wherein the sending module is further configured to send a first data packet to the remote node,
wherein the retransmission buffer is further configured to buffer each first data packet sent by the sending module;
wherein the receiving module is further configured to receive a second retry request from the remote node,
wherein the second retry request includes a sequence number of the first data packet that needs to be retransmitted,
wherein the receiving and decoding module is further configured to decode the second retry request and send the decoded second retry request to the retransmission control module and the system control module,
wherein the system control module is further configured to send control information to the special data packet generating module according to the decoded second retry request to instruct the special data packet generating module to generate a second retry response,
wherein the retransmission control module is configured to send the sequence number of one first data packet that needs to be retransmitted in the second retry request to the retransmission buffer,
wherein the retransmission buffer is further configured to lookup the first data packet that needs to be retransmitted according to the sequence number, and send the first data packet that needs to be retransmitted to the sending module, and
wherein the sending module is further configured to send the first data packet that needs to be retransmitted after sending the second retry response, and then sequentially sending a new first data packet.

9. The node according to claim 8, wherein the retransmission buffer includes a write pointer, and wherein the retransmission buffer is further configured to:
buffer the first data packet in a storage unit to which the write pointer points; and
add 1 to the write pointer to point a next storage unit.

10. The node according to claim 9, wherein the retransmission buffer includes a tail pointer, wherein the receiving module is further configured to receive the first reception acknowledgement information from the remote node, wherein the receiving and decoding module is further configured to decode the first reception acknowledgement information and send the decoded first reception acknowledgement information to the retransmission control module, wherein the retransmission control module is further configured to send the decoded first reception acknowledgement information to the retransmission buffer, and wherein the retransmission buffer is further configured to release the first data packet stored by the storage unit to which the tail pointer points and add 1 to the tail pointer.

11. A computer program product comprising instructions stored on a non-transitory computer-readable medium, wherein the instructions cause a processor to retransmit a data packet in a quick path interconnect (QPI) bus by:
receiving a plurality of second data packets from a remote node, wherein the second data packets do not include a sequence number of the second data packets;
starting a first counter, wherein an initial first count value of the first counter is 0;
determining whether each second data packet is correct;
when one of the second data packets is correct, buffering the one second data packet, adding 1 to the first count value, and sending second reception acknowledgement information to the remote node, wherein the second reception acknowledgement information does not include the sequence number of the one second data packet determined to be correct;
when one of the second data packets is not correct, stopping the first counter from counting, starting a second counter, wherein an initial second count value of the second counter is 0, and sending a first retry request to the remote node, wherein the first retry request includes the first count value, and wherein the first count value denotes a sequence number of the incorrect second data packet;
receiving a new second data packet from the remote node after the second data packet is determined to be incorrect;
determining whether the third data packet is correct;
when the new second data packet is determined to be correct, buffering the new second data packet and adding 1 to the second count value;
after receiving a first retry response, determining whether an initial second data packet behind the first retry response is correct; and
when the initial second data packet is determined to be correct, sending second reception acknowledgement information to the remote node, wherein the second reception acknowledgement information does not include the sequence number of the initial second data packet determined to be correct, adding the second count value to the first count value, and restarting the first counter.

12. The computer program product of claim 11, wherein the instructions further comprise sending second reception acknowledgement information to the remote node corresponding to the new second data packet, and wherein the second reception acknowledgement information does not include the sequence number of the new second data packet.

13. The computer program product of claim 11, wherein the instructions further comprise:
sending a first data packet to the remote node;
buffering the first data packet in a retransmission buffer, wherein the first data packet does not include a sequence number of the first data packet;
when receiving a second retry request from the remote node, wherein the second retry request includes the sequence number of the first data packet that needs to be retransmitted, looking up the first data packet that needs to be retransmitted in the retransmission buffer according to the sequence number of the first data packet that needs to be retransmitted, sending the second retry response to the remote node, and sending the first data packet that needs to be retransmitted after sending the second retry response; and sending a new first data packet.

14. The computer program product of claim 13, wherein the retransmission buffer includes a write pointer, and wherein buffering the first data packet in the retransmission buffer comprises:

buffering, by the retransmission buffer, the first data packet in a storage unit to which the write pointer points; and adding 1 to the write pointer to point to a next storage unit.

15. The computer program product of claim 14, wherein the retransmission buffer includes a tail pointer, and wherein the method further comprises:

after receiving the first reception acknowledgement information from the remote node, releasing, by the retransmission buffer, the first data packet stored by the storage unit to which the tail pointer points; and adding 1 to the tail pointer.

* * * * *

UNITED STATES PATENT AND TRADEMARK OFFICE
CERTIFICATE OF CORRECTION

| | | |
|---|---|---|
| PATENT NO. | : 9,197,373 B2 | Page 1 of 1 |
| APPLICATION NO. | : 14/107109 | |
| DATED | : November 24, 2015 | |
| INVENTOR(S) | : Jiangen Liu, Gang Liu and Weiguang Cai | |

It is certified that error appears in the above-identified patent and that said Letters Patent is hereby corrected as shown below:

On the title page item 30, Foreign Application Priority Data section should read:

Dec. 28, 2011    (CN) ................................. 201110448673.X

Signed and Sealed this
Tenth Day of May, 2016

Michelle K. Lee
*Director of the United States Patent and Trademark Office*